(12) United States Patent
Diener et al.

(10) Patent No.: US 8,634,447 B2
(45) Date of Patent: Jan. 21, 2014

(54) ADAPTION OF MEDIUM ACCESS AND TRANSMISSION PARAMETERS FOR WIRELESS NETWORKS

(75) Inventors: Neil Robert Diener, Hudson, OH (US); Johannes P. Kruys, Harmelen (NL); Lu Qian, Solon, OH (US)

(73) Assignee: Cisco Technology, Inc., San Jose, CA (US)

( * ) Notice: Subject to any disclaimer, the term of this patent is extended or adjusted under 35 U.S.C. 154(b) by 998 days.

(21) Appl. No.: 12/508,028

(22) Filed: Jul. 23, 2009

(65) Prior Publication Data

US 2011/0019721 A1 Jan. 27, 2011

(51) Int. Cl.
 *H04B 1/38* (2006.01)
(52) U.S. Cl.
 USPC ........... 375/219; 375/319; 375/295; 370/329; 370/465; 370/332; 370/252; 370/236; 370/468
(58) Field of Classification Search
 USPC .......... 375/219, 319, 295; 370/329, 465, 332, 370/252, 236, 468
 See application file for complete search history.

(56) References Cited

U.S. PATENT DOCUMENTS

| | | | |
|---|---|---|---|
| 7,355,997 B2 | 4/2008 | Qian et al. | |
| 2005/0239411 A1* | 10/2005 | Hazra et al. | 455/67.11 |
| 2006/0223448 A1 | 10/2006 | Kruys | |
| 2007/0092015 A1* | 4/2007 | Hart et al. | 375/260 |
| 2009/0190558 A1* | 7/2009 | Strutt et al. | 370/332 |

* cited by examiner

*Primary Examiner* — Zewdu Kassa
(74) *Attorney, Agent, or Firm* — Tucker Ellis LLP (57) ABSTRACT

In accordance with an example embodiment, there is disclosed herein an apparatus where transmitter operating parameters are adjusted based on channel condition data obtained from a transmitter and/or from a receiver communicating with the transmitter. For example, the transmitter's contention window may be increased responsive to determining channel occupancy at the receiver is increasing. As another example, aggregation/fragmentation may be adjusted based on channel occupancy at the receiver. Still another example, the data rate employed by the transmitter may be changed responsive to changes in receiver success count.

25 Claims, 4 Drawing Sheets

ADAPTION OF MEDIUM ACCESS AND TRANSMISSION PARAMETERS FOR WIRELESS NETWORKS

TECHNICAL FIELD

The present disclosure relates generally to wireless communications.

BACKGROUND

Many wireless communications employ a medium sharing method based on carrier sensing with multiple access and collision avoidance (CSMA/CA). For example, the Institute of Electrical and Electronics Engineers (IEEE) 802.11 standard defines a CSMA/CA technique that employs exponential back-off in the event of a transmission failure. In addition, the 802.11 standard provides for large packet fragmentation as well as packet aggregation, and for transmitter data rate adjustment. The techniques employed by the 802.11 standard work well for wireless networks with client devices served by an access point (AP) because all of the devices (the client devices and AP) have approximately the same view of the channel state.

As the range of applications expands and the environment in which a wireless network is used becomes more diverse, the assumption that the channel state is consistent for all wireless devices is no longer valid. In order to prevent persistent collisions and congestions due to overly loaded networks, typical medium access methods reduce successive media access attempts (after a transmission failure) by means of an exponential back-off rule. But when packet failures occur due to interferences from hidden or non-CSMA/CA devices, or due to poor signal reception, exponential back-off may result in an extra penalty for having suffered a packet failure, without realizing the intended benefits of backing-off.

BRIEF DESCRIPTION OF THE DRAWINGS

The accompanying drawings incorporated herein and forming a part of the specification illustrate the examples embodiments.

OVERVIEW OF EXAMPLE EMBODIMENTS

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein an apparatus where transmitter operating parameters are adjusted based on channel condition data obtained from a transmitter and/or from a receiver communicating with the transmitter. For example, the transmitter's contention window may be increased responsive to determining that channel occupancy at the receiver is increasing. As another example, aggregation/fragmentation may be adjusted based on channel occupancy at the receiver. Still another example, the data rate employed by the transmitter may be changed responsive to changes in receiver success count.

Description of Example Embodiments

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

In accordance with an example embodiment, disclosed herein is a solution that makes use of "receiver success rate" or also referred to herein "receiver success count" to adjust the transmitter behavior. In an example embodiment causes of receive failure are determined by making use of metrics of Signal to Noise Ration (SNR), interference and expected spectrum occupancy at the receiver or the combinations thereof. In an example embodiment, measuring receiver success at the transmitter is implicit: it is done by observing the ratio between transmissions and acknowledgements—absence of the latter indicate receive failure. This measurement, however, does not differentiate the causes of receive failure: a low SNR gives the same results as a low SIR (Signal to Interference Ratio or 'collisions'). Frequent collisions at the receiver can degrade throughput even though, on average, the Signal Noise and Interference Ratio "SN(I)R" is adequate. Ignoring such differences in the cause packet failures could result in sub-optimal, and sometimes poor Wireless Local Area Network (WLAN) performance.

In an example embodiment, the causes of receive failure are classified as one of two types: "background" and "foreground". "Background" interference is often caused by nearby interference sources such as non-protocol (for example for an IEEE 802.11 WLAN a non-802.11) interference sources, co-channel and/or adjacent channel interference. "Foreground" interference sources are often from stronger signals, which usually cause collisions rather than interference. When foreground interference is strong, packet failure is dominantly due to collisions and aggressive back-off in medium access is desirable. When background interferences is high, the cause of packet failure is more likely poor link quality, therefore, the back-off in medium access should be conservative so as to avoid unnecessary reduction in channel use or even flow starvation.

Measuring "background" interference at the receiver can be done by observing the packet error rate at the transmitter for each data rate being used. Since the observed value reflects both the actual SIR and the multi-path condition of the Radio Frequency (RF) channel, a predicted "receiver success rate" is an adequate predictor of actual receive success. Nevertheless, due to the burst-like nature of many types of data communications traffic, the instantaneous receiver success rate is not always a good predictor of future receiver success. Therefore in particular embodiments this parameter is observed over a certain period of time—e.g. 1 to 10 seconds—so as to smooth the short term variability over a sliding time window.

Presence of strong signals from a nearby transmitter forms "foreground" interference, which can be equated with channel occupancy (CO). Measuring channel occupancy can be done at both receiver and transmitter. Observing the CCA (Clear Channel Assessment), signals of the RF transceiver tells a device the instantaneous channel occupancy—which can be used to create a picture of channel occupancy over some period of time. Channel occupancy at the transmitter indicates the probability that a transmission will cause a collision in the area near the transmitter. Channel occupancy at the receiver indicates the probability that a transmission will fail due to local interference. Therefore, an example embodiment uses the maximum of the channel occupancy values observed at receiver and transmitter.

In an example embodiment, a transmitter adapts its medium access behavior based on feedback from the receiver after a necessary smoothing of the metrics over a sliding time window. When a packet transmission fails, a deviation from the conventional exponential expansion of contention window (CW) may occur depending on the receiver feedback. An example embodiment varies the CW size on the basis of the receiver success rate: a higher success rate leads to a smaller CW and vice versa. This approach assures that the CW size is adjusted to the actual load on the medium. A higher medium load will lead to more collisions for the same CW setting and therefore a larger CW is effective. The reverse applies for a lower load of the medium. Medium load is sensed by the transmitter as it attempts to acquire the medium: repeated failure to acquire the medium and repeated transmission failure due to foreground interference indicates that the CW setting is too low.

In an example embodiment, a transmitter will change its CW settings on a per destination basis. For example, a transmitter has two peers. One is surrounded by other devices and has a low probability of receive success, and the other is free of neighboring devices but that is farther away. The transmitter itself is also free of neighbors. Further assume that the basic CW size is 31. The transmitter may set its CW size to 31 for the peer one and 4 for the peer two. Let's further assume that the back-off timer is set to 16 and 3 for peer one and two respectively. When the channel becomes available at the third contention slot or any time thereafter, the transmitter will attempt to send to the second peer. Once this packet has been transmitted, the transmitter will continue down counting until the channel becomes free at slot 16 or later. This cycle is repeated in case the transmitter fails to acquire the channel. Note that if the channel near the transmitter is busy, the transmitter will set its own contention slot value to avoid colliding with local devices. In the above example, the CW might be set to 7. In that case, the first transmission to the second peer would not occur before slot 7.

As used herein, Receiver Success Rate for a given link (=transmitter–receiver pair) is the ratio between transmitted packets and successfully received packets. Because the success of broadcast and multicast transmissions are not visible to the transmitter, and Acknowledgment (ACK) packets may get lost, the received success count (RSC) is maintained by the receiver and provided to the transmitting device.

In an example embodiment, receive success is determined by packet duration (=rate×size) as well as interference, periodic or otherwise. For the purposes of adaptive medium access, it would be ideal to keep track of the RSC for all packet sizes but in practice it probably is sufficient to take into account a small number of packet durations, for example short, medium and long. RSC can thus be expressed as the counts of the correctly received packets from Tx during a given interval.

For example $RSC=(cnt_{short}, cnt_{med}, cnt_{long})$. Where packets less than a first predetermined time (for example 10 microseconds) are considered as short duration, packets larger than a second predetermined time (for example 300 microseconds) are considered long duration, and packets between the first and second time periods are considered medium duration. Note that using success counts from the receiver assures that both multicast and multiple transmissions per Transmission Opportunity (TxOP) are correctly taken into account. Since the transmitter knows the number of packets sent, the Receive Success Rate values can easily be calculated.

Channel Occupancy (CO) is the ratio between $CCA_{busy}$ and $CCA_{free}$ over a given time period and relative to given threshold.

$$CO=CCA_{busy}/(CCA_{busy}+CCA_{free})$$

The possibility exists that there is interference at the receiver that may not hinder the actual receiving of data packets: in other words the intended receiver will successfully capture the transmissions of this sender. Therefore the $CCA_{busy}$ count should be reduced by the number of events in which the CCA threshold was exceeded but a packet was correctly received. Note that the CCA threshold may be set adaptively by the receiver—the transmitter does not need to know what it is.

In an example embodiment, the feedback from receiver to transmitter is comprised of RSC and CO. In an example embodiment, four bytes is adequate (e.g. to keep a precision at the order of 1%). These four bytes can be, for example, put into the Medium Access Control (MAC) header of a packet or an Information Element (IE) may be added to the packet.

As noted above, duration dependent values of the RSC can be used to help the transmitter to determine which data rate is optimum. In an example embodiment, there is a known relationship between the BER (Bit Error Rate) and PER (Packet Error Rate) as a function of packet size. If that relationship predicts a better PER than observed, the main cause of packet failure is likely insufficient SNR, and data rate and packet size can be treated accordingly, Taking this into account, the data rate can be determined by an algorithm that uses the data rate with the highest success rate, and the packet aggregation/fragmentation size can be pre-configured but in such a way that packet duration is independent of data rate.

On the other hand, if the ratio is worse than expected based on the above relationship, collisions at the receiver are likely an additional cause of receive failure. In that case, a search for optimal data rate is likely to be counter-productive. A high failure rates combined with an adequate SNR indicates that an increase in CW size and a reduction in packet duration might be beneficial.

If the SNR is excellent, the reduction in packet duration by increasing the transmission rate makes sense, otherwise fragmentation is advisable. Note that the received power level at the transmitter (when receiving acknowledgements from the receiving device, assuming channel reciprocity) may be used as a proxy for SNR at the receiver, and a better indicator of optimal data rate. However, this technique ignores multi-path and related channel degradation factors.

When RSC values vary, this can provide a direct indication of the packet size that is optimal for the interference conditions at the receiver. Alternatively, the transmitter can use this variance as an indication that it should attempt to search over different packet sizes to determine the optimum aggregation/fragmentation size.

In an example embodiment, differentiated services in a CSMA environment rely on differential CW offsets (for example an Arbitrated Interframe Space "AIFS" in an IEEE 802.11 implementation) to create separate or overlapping contention windows for different service classes. In these embodiments, the adaptive setting of the CW size as described herein should be applied only to the variable part of the CW and not the AIFS part. This assures that the required degree of separation between different service classes is maintained. The resulting transmit parameters for each medium access attempt for the same destination but a different service type will differ with e.g. the typical packet size of a given service type: voice packets will be sent under other parameters than long data packets In accordance with an example embodiment, table 1 below illustrates examples of channel conditions and response choices. Following Table 1 is a short explanation for the response choices

TABLE 1

|  |  | Receiver Success trend | |
|---|---|---|---|
|  |  | Up | Down |
| Channel Occupancy trend | Down | Case 1 Decrease CW Increase Data Rate Increase Packet Size | Case 2 Decrease CW Decrease Data Rate Increase Packet Size |
|  | Up | Case 3 Increase CW Increase Data Rate Decrease Packet Size | Case 4 Increase CW Decrease Data Rate Decrease Packet Size |

Explanation of the Cases:

Case 1: channel occupancy decreasing and on channel conditions improving:
 Decreasing CW makes sense because there is no risk of increased collisions;
 The Data rate can be increased because the noise level at the receiver dropped or the propagation conditions improved;
 Packet size can be increased—e.g. by aggregation to make use of the improved conditions.

Case 2: channel occupancy decreasing but channel conditions deteriorating:
 Decreasing CW makes sense because there is no risk of increased collisions;
 Decreasing the data rate makes sense because that reduces the required SINR;
 Increasing the packet size through aggregation may make sense because interference is not a factor—in combination with a reduced data rate, the increased packets size helps to maintain throughput.

Case 3: channel occupancy increasing, channel conditions improving:
 Increasing CW makes sense because there is a greater risk of collisions;
 Increasing the data rate makes sense because the required SINR is available;
 Decreasing the packet size by reducing aggregation or even fragmentation, may make sense because there is increased risk of collisions. Reducing packet size would reduce transmission time.

Case 4: channel occupancy increasing and channel conditions deteriorating:
 Increasing CW makes sense because there is more risk of collisions,
 Decreasing the data rate makes sense because that reduces the required SINR
 Decreasing the packet size by reducing aggregation or even fragmentation, may make sense because there is increased risk of collisions The above options present possible choices that a transmitter may make. The actual choice in a given case, however, should take into account the current "mode" of operation and also look at the effect of choices made in the past.

Figure 1:
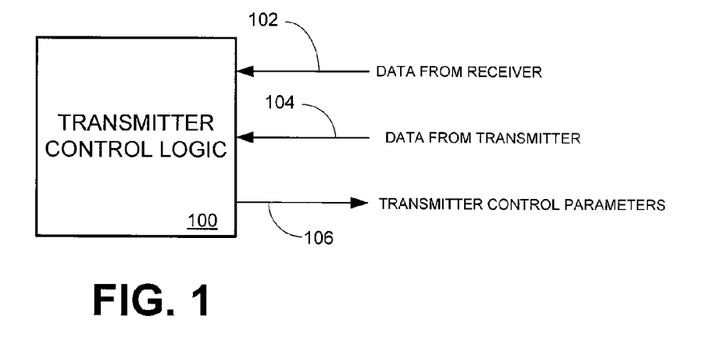
FIG. 1 illustrates an example of logic suitable for controlling the operation of a transmitter in accordance with an example embodiment.

In view of the foregoing, FIG. 1 illustrates an example of transmitter control logic 100 suitable for controlling the operation of a transmitter in accordance with an example embodiment. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software.

Transmitter control logic 100 is configured to receive data from a receiver in communication with the transmitter indicated by 102 and data from a transmitter coupled to transmitter control logic 100 indicated by 104. As described herein, transmitter control logic 100 provides transmitter control parameters to the transmitter as indicated by 106.

In an example embodiment, transmitter control logic 100 is configured to receive data representative of channel conditions from a receiver. This data may include, but not be limited to, channel occupancy data, signal quality data such as signal to noise ratio (SNR), and/or receiver success count data. Transmitter control logic is further configured to receive data representative of channel conditions observed by the transmitter. The data received from the transmitter may include, but is not limited to, channel occupancy data and signal quality data.

In an example embodiment, transmitter control logic is configured to determine whether foreground interference is more dominant than background interference. By dominant is meant which source of interference is the more likely cause of failure to receive a packet, foreground interference or background interference. As described herein, "Background" interference is often caused by nearby interference sources such as non-protocol (for example for an IEEE 802.11 WLAN a non-802.11 interference sources) interference sources, co-channel and/or adjacent channel interference. "Foreground" interference sources are often from stronger signals, which usually cause collisions rather than interference. When foreground interference is strong, packet failure is dominantly due to collisions and aggressive (shorter) back-off in medium access is desirable. When background interferences is high, the cause of packet failure is more likely poor link quality, therefore, the back-off in medium access should be conservative (longer) so as to avoid unnecessary reduction in channel use or even flow starvation.

In an example embodiment, the channel condition data obtained from the receiver comprises data representative of channel occupancy. Transmitter control logic 100 is responsive to decrease contention window size for the transmitter responsive to determining that channel occupancy is decreasing. Transmitter control logic 100 may be further responsive to increase contention window size for the transmitter responsive to determining that channel occupancy is increasing. In particular embodiments, transmitter control logic 100 also receives channel occupancy data from the transmitter and selects the channel occupancy that is the maximum of the channel occupancy at the receiver and the channel occupancy at the transmitter. Transmitter control logic 100 may also be configured to change the packet size (e.g. change aggregation or fragmentation) of packets sent by the transmitter in response to changes in channel occupancy. For example, transmitter control logic 100 may increase the size of packets sent by the transmitter responsive to determining that the channel occupancy is decreasing. Moreover, transmitter control logic 100 may decrease the size of packets sent by the transmitter responsive to determining that the channel occupancy is increasing.

In an example embodiment, the channel condition data received by transmitter control logic 100 from a receiver comprises data representative of packets successfully received by the receiver (e.g. a receiver success count). Because the transmitter knows how many packets were sent, the transmitter can calculate a receiver success rate (RSR) based on the number of packets successfully received reported by the receiver (e.g. RSR=#packets_received/#packets_sent).

In an example embodiment, transmitter control logic 100 changes the contention window size for the transmitter based on changes in receiver success rate. Transmitter control logic 100 may increase contention window size responsive to determining the receiver success count is decreasing. Moreover, transmitter control logic 100 may decrease contention window size responsive to determining the receiver success count is increasing.

In an example embodiment, transmitter control logic 100 changes the data rate of packets sent by the transmitter responsive to changes in the receiver success rate. For example, transmitter control logic 100 may decrease the data rate responsive to determining the receiver success count is decreasing. As another example, transmitter control logic 100 increases a data rate responsive to determining the receiver success count is increasing.

In an example embodiment, the channel condition data transmitter control logic 100 receives from the receiver comprises data representative of signal to noise ratio measured at the receiver. Transmitter control logic 100 is responsive to change the data rate of packets sent by the transmitter responsive to changes in the signal to noise ratio. For example, transmitter control logic 100 may decrease the data rate responsive to determining the signal to noise ratio is decreasing. Alternatively, transmitter control logic 100 may increase the data rate responsive to determining the signal to noise ratio is increasing.

In an example embodiment, transmitter control logic 100 maintains a sliding average of channel condition data. For example, transmitter control logic 100 may maintain an average for channel occupancy and receiver success rate for a most recent time period, such as the last 500 milliseconds, last second, 10 seconds, etc.

In an example embodiment, transmitter control logic 100 may receive data from a plurality of receivers. Transmitter control logic 100 may be configured to maintain channel condition data for each of the plurality of receivers separately. Thus, the medium access and transmission parameters for each receiver may be different. The medium access and transmission parameters for each receiver may be based on conditions observed at each receiver.

In an example embodiment, transmitter control logic 100 is configured to determine a receiver success count based on packet duration. For example, a receiver success count may be maintained for short packets (e.g. packets less than sixteen microseconds), long packets (e.g. packets greater than three hundred microseconds) and medium duration (e.g. packets larger than sixteen microseconds and less than 300 microseconds). Note that the length of packet duration may be varied. This can allow for medium access and transmission parameters to be based on the duration of the packet being transmitted.

In an example embodiment, transmitter control logic 100 is configured to obtain the channel condition data from the receiver from a header of a frame received from the receiver. For example, from the header of a data frame and/or a management frame. In another example embodiment, transmitter control logic 100 is configured to obtain the channel condition data from the receiver via an information element from a frame received from the receiver.

Figure 2:
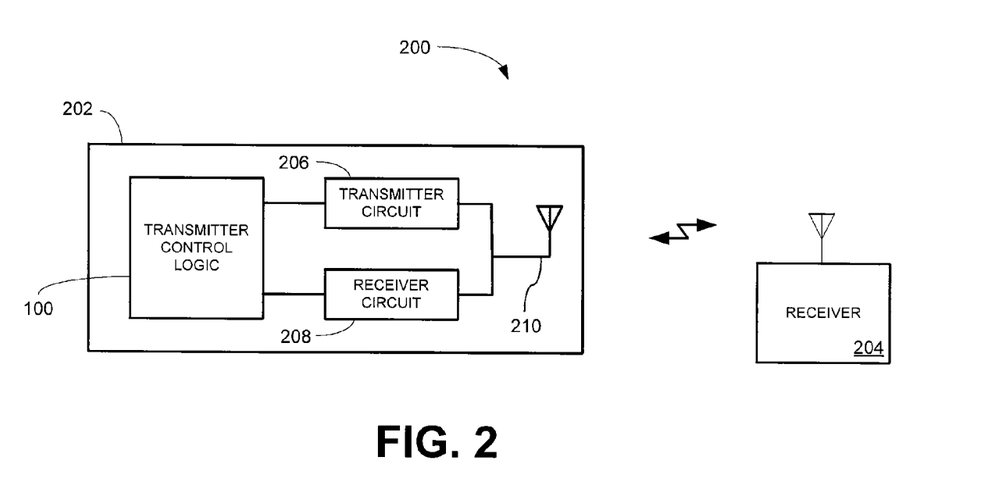
FIG. 2 illustrates an example of a transmitter communicating with a receiver in accordance with an example embodiment.

FIG. 2 illustrates an example of a system 200 comprising a transmitter 202 communicating with a receiver 204 in accordance with an example embodiment. Transmitter control logic 100 is coupled to transmitter circuit 206 which sends wireless signals via antenna 210 to receiver 204. Receiver circuit 208 receives wireless signals from receiver 204. In accordance with an example embodiment, transmitter control logic 100 can obtain channel condition data from transmitter circuit 206 which provides channel conditions as observed at the location of transmitter 202. Receiver 204 periodically provides data representative of the channel conditions observed by receiver 204 to transmitter control logic 100 via wireless signals received by receiver circuit 208 via antenna 210. Transmitter control logic 100 can adaptively control medium access and transmission parameters employed by transmitter 206 using the techniques described herein.

Figure 3:
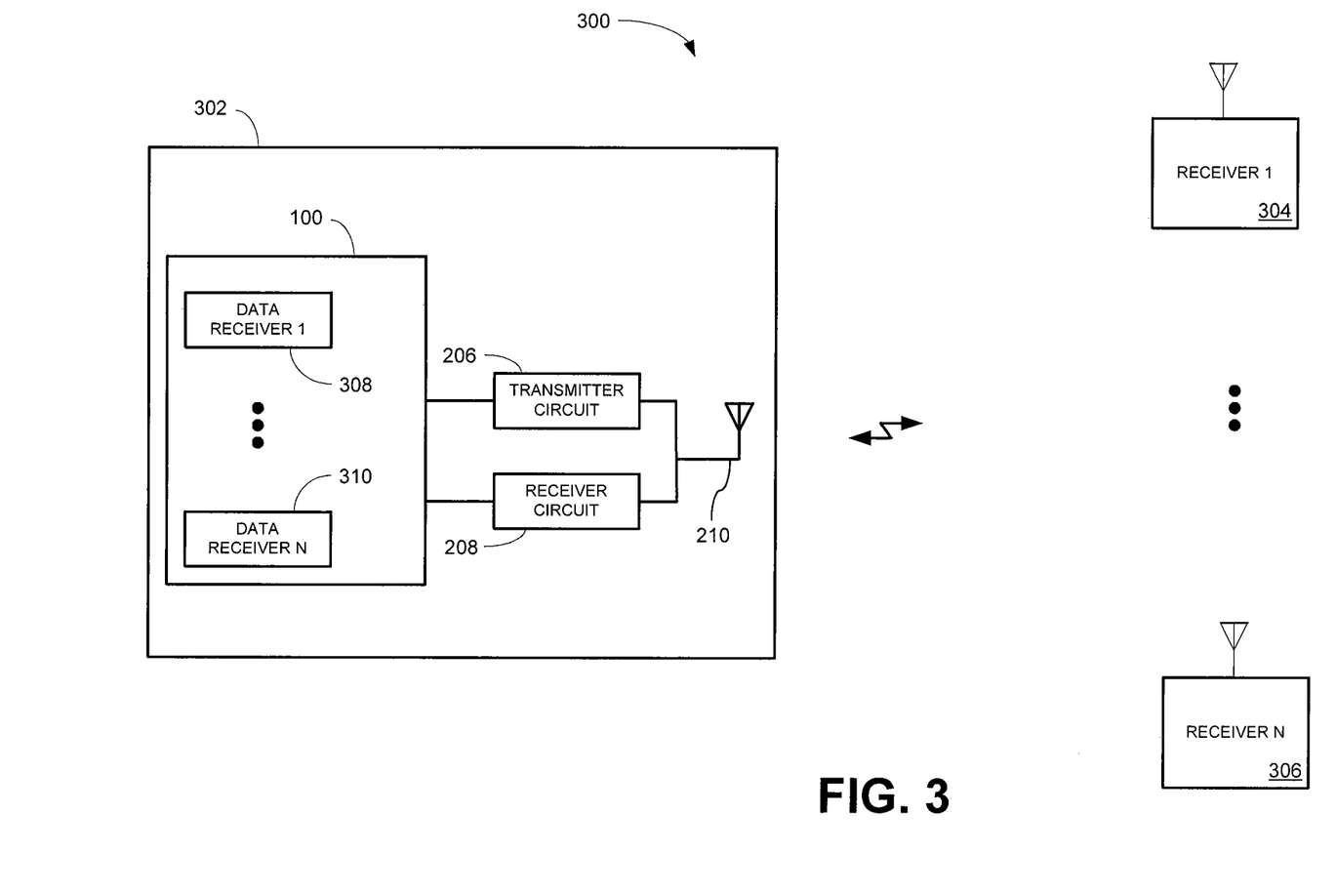
FIG. 3 illustrates an example of a transmitter communicating with a plurality of receivers in accordance with an example embodiment.

FIG. 3 illustrates an example of a wireless local area network (WLAN) 300 having a first wireless device 302 communicating with a plurality of receivers 304, 306 in accordance with an example embodiment. In this embodiment, transmitter control logic 100 maintains separate data for each receiver. In this example there are N receivers, where N is an integer greater than 1 and can be any physically realizable number of receivers. For example data for receiver 1 304 corresponds to channel condition data (and optionally parameters measured by transmitter circuit 206) for receiver 1 304 and data for receiver N 306 corresponds to channel condition data (and optionally parameters measured by transmitter circuit 206) for receiver N 306. Transmitter control logic 100 can be configured to employ the techniques described herein to separately control medium access parameters such as the contention window and transmission parameters such as packet size and data rate separately for each receiver.

Figure 4:
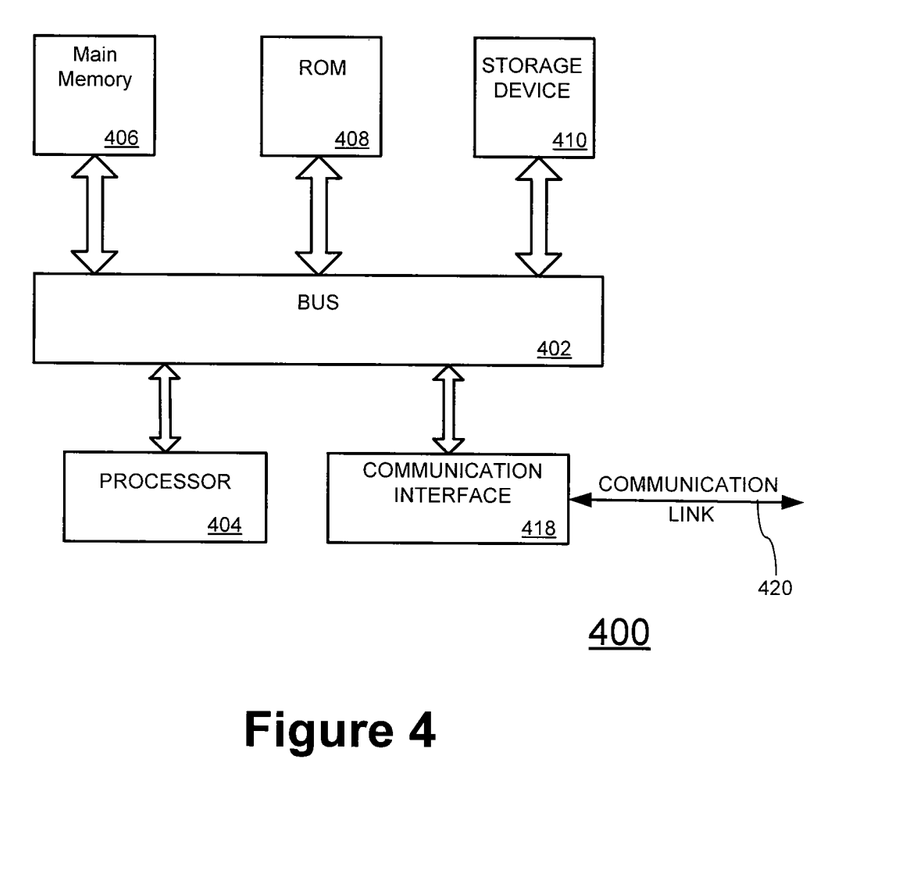
FIG. 4 illustrates an example of a computer system upon which an example embodiment may be implemented.

FIG. 4 illustrates an example of a computer system 400 upon which an example embodiment may be implemented. Computer system 400 is suitable for implementing transmitter control logic 100 described herein.

Computer system 400 includes a bus 402 or other communication mechanism for communicating information and a processor 404 coupled with bus 402 for processing information. Computer system 400 also includes a main memory 406, such as random access memory (RAM) or other dynamic storage device coupled to bus 402 for storing information and instructions to be executed by processor 404. Main memory 406 also may be used for storing a temporary variable or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

An aspect of an example embodiment is related to the use of computer system 400 for adaptation of medium access and transmission parameters for wireless networks. According to one embodiment of the invention, adaptation of medium access and transmission parameters for wireless networks is provided by computer system 400 in response to processor 404 executing one or more sequences of one or more instructions contained in main memory 406. Such instructions may be read into main memory 406 from another computer-readable medium, such as storage device 410. Execution of the sequence of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to non-volatile media and volatile media. Non-volatile media include for example optical or magnetic disks, such as storage device 410. Volatile media include dynamic memory such as main memory 406. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Various forms of computer-readable media may be involved in carrying one or more sequences of one or more instructions to processor 404 for execution. For example, the instructions may initially be borne on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406 from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may include a transmitter circuit, the operation of which is controlled by processor 404 executing instructions that provide the functionality described herein. In addition, processor 404 may receive channel condition data from a receiver via communication link 420 and communication interface 418 enabling processor 404 to provide for adaptive medium access control and transmission parameters described herein.

Figure 5:
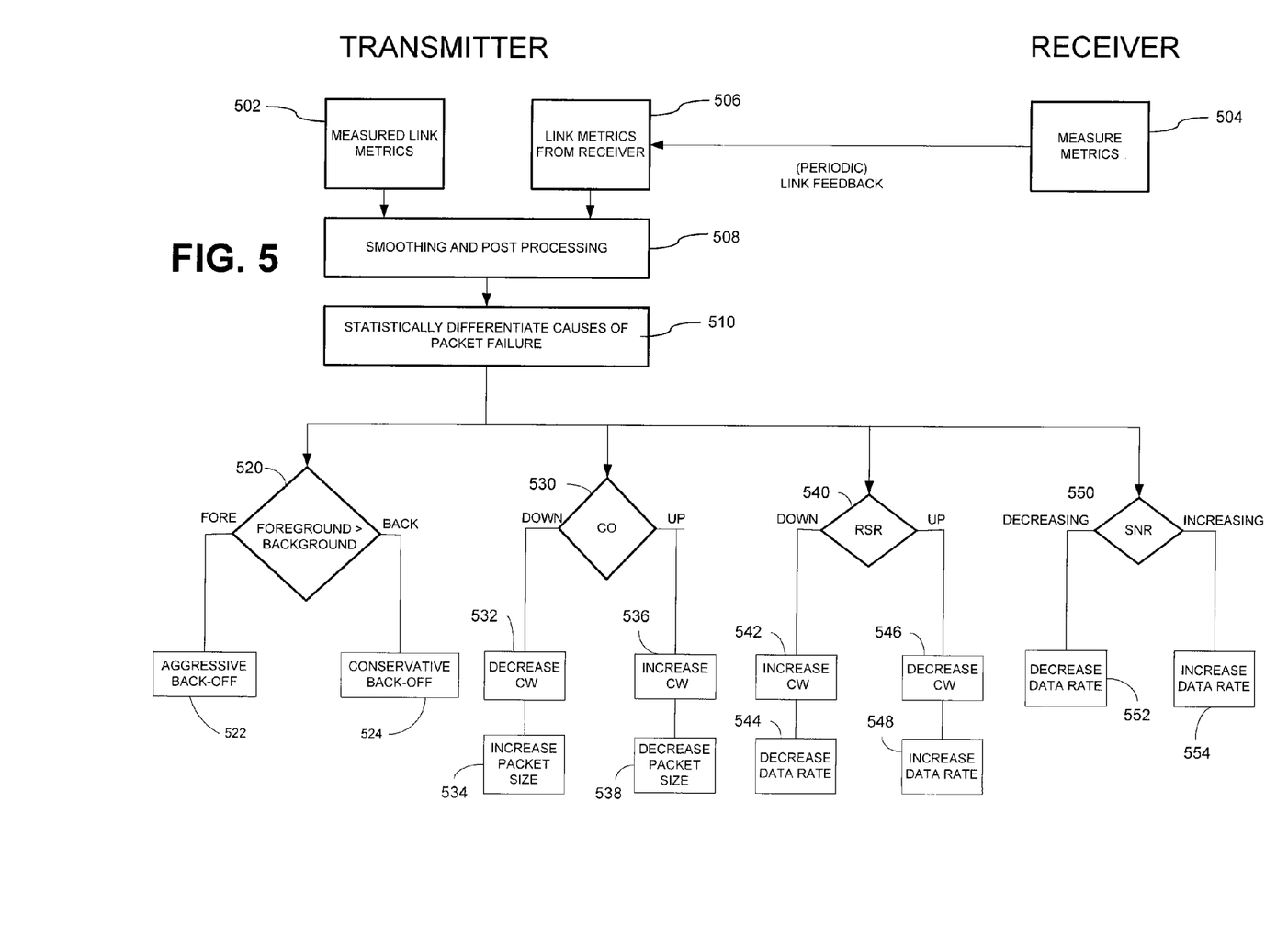
FIG. 5 illustrates an example of a methodology in accordance with an example embodiment.

In view of the foregoing structural and functional features described above, a methodology in accordance with an example embodiment will be better appreciated with reference to FIG. 5. While, for purposes of simplicity of explanation, the methodology of FIG. 5 is shown and described as executing serially, it is to be understood and appreciated that the example embodiment is not limited by the illustrated order, as some aspects could occur in different orders and/or concurrently with other aspects from that shown and described herein. Moreover, not all illustrated features may be required to implement a methodology in accordance with an aspect the example embodiment. The methodology described herein is suitably adapted to be implemented in hardware, software, or a combination thereof.

At 502, measured link metrics are obtained from a transmitter. For example, referring to FIG. 2 with continued reference to FIG. 5, the link metrics obtained are the channel conditions observed by transmitter circuit 206. The measured link metrics may include, but are not limited to, data representative of channel occupancy and signal quality.

At 504, measured link metrics are obtained from a receiver. For example, referring to FIG. 2 with continued reference to FIG. 5, the link metrics obtained are the channel conditions observed by receiver 204. The measured link metrics may include, but are not limited to, data representative of channel occupancy and signal quality. At 506, the link metrics are received from the receiver. The link metrics may be provided periodically.

At 508, the measured link metrics obtained from the transmitter and receiver may be post processed and smoothed. For example, older measurements may be aged out and a moving average for a predetermined time period may be calculated.

At 510, the causes of packet failure are determined. The causes of packet failures may be statistically determined based on observed channel conditions at the transmitter and receiver. 520, 530, 540, 550 are examples of causes of packet failure and the action that may be taken to compensate for these causes.

At 520, it is determined whether the causes of packet failure are predominantly due to foreground interference or background interference. If at 520 the cause is determined to be foreground interference (FORE), at 520 an aggressive back-off scheme is employed. If, however, at 520 the cause is determined to be background interference (BACK), at 524 a conservative back-off scheme is employed.

At 530, medium access and transmission parameters are adjusted based on changes to channel occupancy (CO). The channel occupancy may be the channel occupancy at the transmitter, receiver or the maximum channel occupancy selected from a group consisting of the transmitter and receiver. For example, if at 530 channel occupancy is decreasing (DOWN), at 532 the contention window is decreased and at 534 packet size is increased. If, however, at 530 channel occupancy is increasing (UP) at 536 the contention window is increased and at 538 packet size is decreased.

At 540, medium access and transmission parameters are adjusted based on changes to receiver success rate (RSR). A receiver success count (RSC) can be employed in determining RSR. Because the number of packets sent by a transmitter is known, the RSR for any time interval can be easily calculated as (# packets received by receiver)/(#packets sent). For example, if at 540 receiver success rate is decreasing (DOWN), at 542 the contention window is increased and at 544 data rate is decreased. If, however, at 540 receiver success rate is increasing (UP) at 546 the contention window is decreased and at 548 data rate is increased. In particular embodiments, receiver success rate may be computed by packet size. For example, a RSR may be computed for short packets, medium sized packets and long packets. The RSR may also be computed as a function of packet duration, e.g. packets having a transmit time of under 16 microseconds, packets having a transmit time greater than 300 microseconds, and packets having a transmit time between 16 and 300 microseconds.

It should be noted that there may be instances in embodiments that change the contention window based on both CO and RSR may have conflicting results. in practice this situation would probably be rare; however, additional rules may be employed to decide whether to prioritized contention window adjustment based on CO, RSR and/or to maintain the same size contention window in the event of a conflict.

At 550, a transmission parameters is adjusted based on changes to signal quality (in this example to the signal to noise ratio "SNR"). If at 550 signal quality is deteriorating (SNR decreasing), at 552 the data rate is decreased. If, however, at 550 the signal quality is improving (e.g. SNR is increasing) at 554 the data rate is increased.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
a wireless transmitter;
logic coupled to the wireless transmitter and configured to control the operation of the transmitter;
wherein the logic is configured to obtain channel condition data from the transmitter;
wherein the logic is configured to obtain channel condition data from a receiver communicatively coupled with the wireless transmitter;
wherein the logic is configured to perform a smoothing function on channel condition data consisting of data obtained from the transmitter and channel condition data obtained by the receiver;
wherein the logic is configured to perform the smoothing function on the channel condition data in accordance with a series of previously obtained channel condition data over a specified span;
wherein the logic is configured to have the wireless transmitter employ an aggressive back-off responsive to determining that foreground interference is more dominant than background interference in accordance with smoothed channel condition data.

2. The apparatus set forth in claim 1, wherein the logic is configured to have the wireless transmitter employ a conservative back-off responsive to determining that background interference is more dominant than foreground interference.

3. The apparatus set forth in claim 1, wherein the channel condition data from the receiver comprises data representative of channel occupancy; and
wherein the logic is operable to decrease contention window size for the wireless transmitter responsive to determining that channel occupancy is decreasing.

4. The apparatus set forth in claim 3, wherein the channel condition data from the wireless transmitter comprises data representative of channel occupancy; and
wherein the logic selects the channel occupancy that is the maximum of the channel occupancy at the receiver and the channel occupancy at the transmitter.

5. The apparatus set forth in claim 1, wherein the channel condition data from the receiver comprises data representative of channel occupancy; and
wherein the logic increases packet size of packets sent by the transmitter responsive to determining that the channel occupancy is decreasing.

6. The apparatus set forth in claim 1, wherein the channel condition data from the receiver comprises data representative of channel occupancy; and
wherein the logic is operable to increase a contention window for the wireless transmitter responsive to determining that channel occupancy is increasing.

7. The apparatus set forth in claim 1, wherein the channel condition data from the receiver comprises data representative of channel occupancy; and
wherein the logic decreases a packet size of packets sent by the transmitter responsive to determining that the channel occupancy is increasing.

8. The apparatus set forth in claim 1, wherein the channel condition data from the receiver comprises data representative of receiver success count; and
wherein the logic increases a contention window size responsive to determining the receiver success count is decreasing.

9. The apparatus set forth in claim 1, wherein the channel condition data from the receiver comprises data representative of receiver success count; and
wherein the logic decrease a contention window size responsive to determining the receiver success count is increasing.

10. The apparatus set forth in claim 1, wherein the channel condition data from the receiver comprises data representative of receiver success count; and
wherein the logic decreases a data rate responsive to determining a receiver success rate is decreasing.

11. The apparatus set forth in claim 1, wherein the channel condition data from the receiver comprises data representative of receiver success count; and
wherein the logic increases a data rate responsive to determining a receiver success rate is increasing.

12. The apparatus set forth in claim 1, wherein the channel condition data from the receiver comprises data representative of signal to noise ratio measured at the receiver; and
wherein the logic increases transmitter data rate responsive to determining the signal to noise ratio is increasing.

13. The apparatus set forth in claim 1, wherein the channel condition data from the receiver comprises data representative of signal to noise ratio measured at the receiver; and
wherein the logic decreases transmitter data rate responsive to determining the signal to noise ratio is decreasing.

14. The apparatus set forth in claim 1, wherein the logic is configured to calculate an average channel occupancy and receiver success count for a preceding predetermined time period.

15. The apparatus set forth in claim 1, wherein the wireless transceiver communicates with a plurality of receivers;
wherein the logic is configured to receive channel condition data from each of the plurality of receivers; and
wherein the logic is configured maintain channel condition data for each of the plurality of receivers separately.

16. The apparatus set forth in claim 1, wherein the logic is configured to determine a receiver success counts for different packet durations.

17. The apparatus set forth in claim 1, wherein the logic is configured to obtain the channel condition data from the receiver from a Medium Access Control header of one of a group consisting of a data packet, a control frame and a management frame received from the receiver via the wireless transceiver.

18. The apparatus set forth in claim 1, wherein the logic is configured to obtain the channel condition data from the receiver from an information element from a frame received from the receiver via the wireless transceiver.

19. An apparatus, comprising:
a wireless transmitter;
logic coupled to the wireless transmitter and configured to control the operation of the transmitter;
wherein the logic is configured to obtain channel condition data from a receiver communicatively coupled with the wireless transmitter;
wherein the logic is configured to perform a smoothing function on channel condition data consisting of data obtained from the transmitter and channel condition data obtained by the receiver;
wherein the logic is configured to perform the smoothing function on the channel condition data in accordance with a series of previously obtained channel condition data over a specified span;
wherein the logic is configured to increase transmitter data rate responsive to determining from smoothed channel condition data from the receiver that receiver success count is increasing.

20. An apparatus, comprising:
a wireless transmitter;
logic coupled to the wireless transmitter and configured to control the operation of the transmitter;
wherein the logic is configured to obtain channel condition data consisting of data obtained from a receiver communicatively coupled with the wireless transmitter;
wherein the logic is configured to perform a smoothing function on the channel condition data;
wherein the logic is configured to perform the smoothing function on the channel condition data in accordance with a series of previously obtained channel condition data over a specified span;
wherein the logic is configured to decrease packet size responsive to determining that channel occupancy is increasing based on smoothed channel condition data received from the receiver.

21. A method, comprising:
obtaining channel condition data consisting of data obtained from a transmitter over a period of time;
obtaining channel condition data from a receiver communicatively coupled with the wireless transmitter over the period of time;
performing a smoothing function on the channel condition data in accordance with a series of previously obtained channel condition data over a specified span;
determining foreground and background interference over the specified span based on the channel condition data obtained from the transmitter and the channel condition data obtained from the receiver; and
decreasing a contention window, increasing a data rate, and increasing packet size responsive to determining foreground interference and background interference are decreasing over the period of time.

22. The method set forth in claim 21, further comprising:
obtaining channel condition data from a plurality of receivers communicatively coupled with the wireless transmitter; and
maintaining a separate setting for back-off, contention window, packet size, and data rate for communicating with each of the plurality of receivers.

23. The method set forth in claim 21, comprising:
obtaining a receiver success count based on a plurality of ranges of packet sizes; and
maintaining a separate setting for back-off, contention window, and data rate for each of the plurality of packet sizes.

24. The method set forth in claim 21, wherein the channel condition data obtained from the receiver comprises receiver success count and channel occupancy.

25. The method set forth in claim 21, changing a back-off setting to a conservative back-off setting responsive to determining that background interference is more dominant than foreground interference.

* * * * *